(No Model.)

C. A. YONT.
AUTOMATIC STOCK WATERING TROUGH.

No. 444,911. Patented Jan. 20, 1891.

Witnesses:
Chas. Peddle
Charles J. Geder

Inventor:
Chas. A. Yont

UNITED STATES PATENT OFFICE.

CHARLES A. YONT, OF BROCK, NEBRASKA.

AUTOMATIC STOCK-WATERING TROUGH.

SPECIFICATION forming part of Letters Patent No. 444,911, dated January 20, 1891.

Application filed May 21, 1890. Serial No. 352,673. (No model.)

*To all whom it may concern:*

Be it known that I, CHARLES A. YONT, a citizen of the United States, and a resident of Brock, in the county of Nemaha and State of Nebraska, have invented certain new and useful Improvements in Automatic Stock-Watering Troughs; and I do hereby declare the following to be a full, clear, and exact description of my invention, such as will enable others skilled in the art to which it pertains to make and use it, reference being had to the accompanying drawings, which form part of this specification.

My invention relates to an improvement in that class of animal drinking-troughs in which the supply of water from the main tank or reservoir to the drinking-trough is controlled by a valve actuated by the animal while in the act of drinking.

Heretofore in the use of automatic stock-troughs or drinking-cups the animal, in order to replenish the supply of water from which it drank, was compelled to press with the forehead or snout against some kind of valve-actuating mechanism, and this often required more weight and strength from the smaller animals than they possessed, while the larger animals, being usually ringed or snouted, only obtained water with pain and difficulty; also, when the valve-plate is placed within and near the bottom of the drinking-cup the snout of the animal is necessarily submerged while drinking, and the disturbance of the water from the exhaust of the animal's breath stirs up the sediment from the bottom of the trough and compels it to be drank, to the injury of stock.

The object of my invention is to remedy this difficulty and to provide a drinking-trough from which animals of all sizes may drink easily and without waste of water. It also permits of a small, compact, and durable drinking-cup, complete in itself, and which may be easily and quickly attached to any kind of barrel or tank.

My invention consists of a small drinking-cup of suitable shape and preferably of metal, having connection with a tank or other body of water by means of a pipe fitted at the inner end with a check-valve. Extending around and just above the edge of the drinking-cup is a bail, hinged at the back and having operative connection with the valve, and intended to admit water into the cup when depressed by the chin of the animal.

Figure 1:
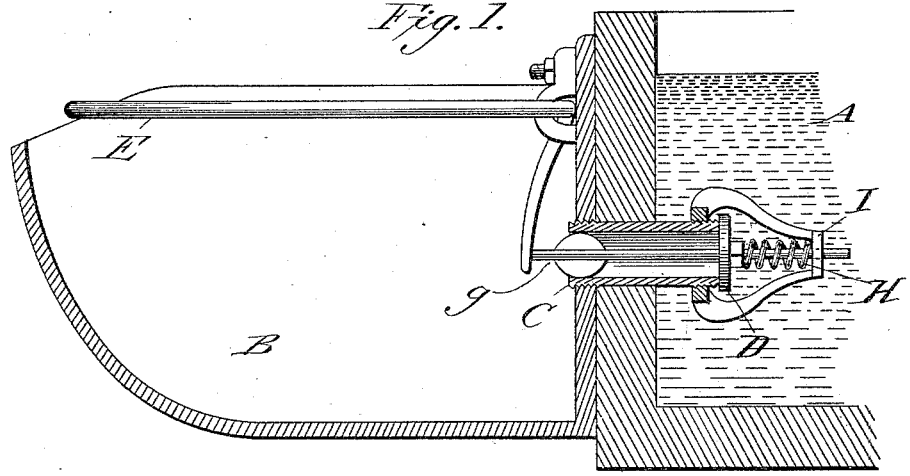
Figure 2:
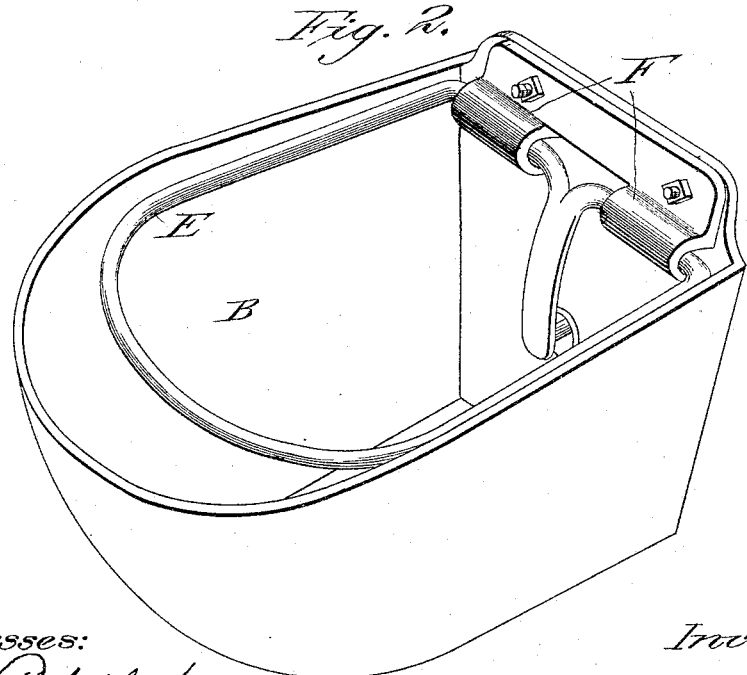

In the accompanying drawings, Figure 1 is a sectional view of the drinking-trough, showing in detail the cup, supply-pipe, valve, and valve-actuating bail. Fig. 2 is a view in perspective of the same, showing it in operative position and also the position of the bail in the trough.

The letter A represents the tank, which may be of any desired size, but should be so placed that the level of water therein is above the drinking-cup, in order that the latter may be supplied by hydrostatic force. Securely bolted to the side of the tank and low enough to be accessible to all sizes of stock is the drinking-trough B, which is of a size to admit easily the nose of an animal, and is made, preferably, of iron, with every side flaring from the bottom to facilitate cleaning and to avoid danger of breakage by freezing. This cup is tapped through the back and fitted with a piece of water-pipe C, which projects through the side of the tank and is provided at its inner end with the valve D. The supply-pipe should of course be connected in a water-tight manner with the walls of the tank and extend far enough within the same to bring the valve near the center of the body of water to prevent its freezing fast in cold weather.

The letter E indicates the actuating-bail. It extends entirely around the inside of the upper edge of the cup and just above the edge in front. The bail is hinged at the rear by means of the lugs F F, and the two descending ends are formed into one vertical leg, which rests in contact with the front end of the valve-stem $g$. A spiral spring H, about the inner end of the valve-stem, secured at one end by the yoke I and the other end abutting against the valve with sufficient pressure to hold the same in a water-tight manner to its seat, is intended to support the actuating-bail in operative position just above the front edge of the drinking-cup. The valve-stem is guided centrally within the supply-pipe by extending through a hole in the end of the yoke, while the forward end is provided with radial flanges.

The operation will be obvious from the above description. Any animal, such as a hog, while drinking, will follow with its nose the lowering level of the water in the cup, and the chin soon comes in contact with the bail E, which offers a slight resistance, owing to the tension of the valve-spring H. The valve thus forced from its seat admits water, which rapidly seeks its level and is checked, as the animal finding an abundance of water ceases to depress the bail. This makes it impossible to drink the cup entirely empty, and the small quantity of water always remaining offers an inducement to the next animal to drink. The shape and size of the drinking-cup, together with the small quantity of exposed water, permits stock at all times to drink from the main body of water without the possibility of being able to get into and rendering it filthy, while the low bottom of the cup retains the sediment falling from the nose of the animal and which should be removed at intervals. Should stock be inclined to press the bail and needlessly overflow the cup, the valve-stem may be screwed back through the valve far enough to allow the bail to sink somewhat below the edge of the cup.

I am aware that prior to my invention stock-watering devices have been made in which the supply of water is regulated by the animal while drinking. I therefore do not claim such a combination, broadly; but What I do claim as my invention, and desire to secure by Letters Patent, is—

In an automatic stock-watering trough, an actuating-bail encircling the upper edge of the drinking-cup, fulcrumed at the rear, the ends there forming a vertically-depending leg resting normally in operative contact with the projecting head of the valve-bolt and adapted to admit water to the cup when bail is depressed by the chin or neck of the animal, substantially as and for the purpose stated.

In testimony that I claim the foregoing as my own I have hereunto affixed my signature in the presence of two witnesses.

CHAS. A. YONT.

Witnesses:
HUGH BERTON,
M. E. GOOD.